July 6, 1954  R. E. MARSHALL  2,682,677
DRAIN TILE CLEANER
Filed Dec. 23, 1948  2 Sheets-Sheet 1
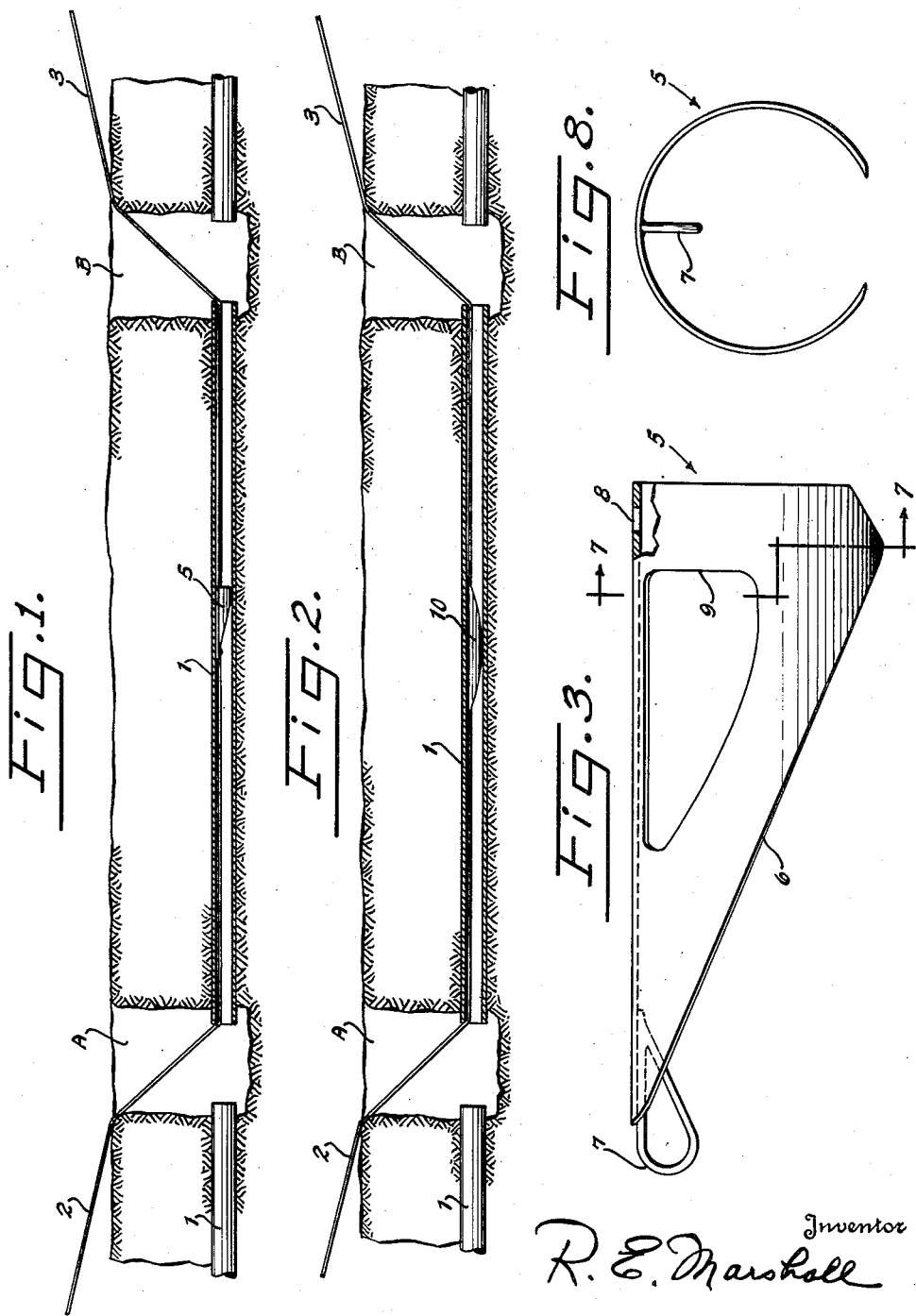
Inventor
R. E. Marshall
By Albert H. Kirchner
ATTORNEY

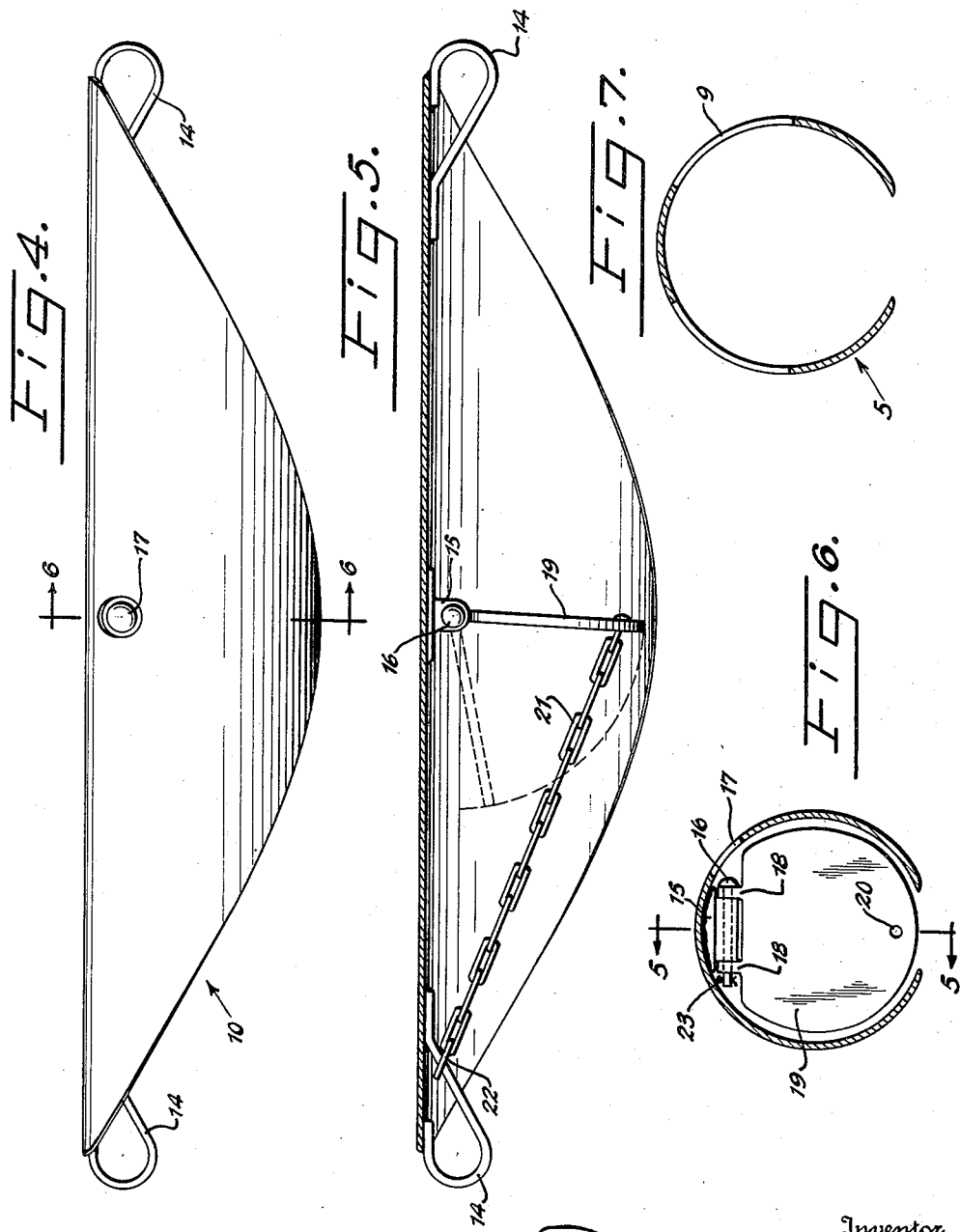

Patented July 6, 1954

2,682,677

UNITED STATES PATENT OFFICE 2,682,677

DRAIN TILE CLEANER

Raymond Everett Marshall, Union City, Ind.

Application December 23, 1948, Serial No. 67,050

2 Claims. (Cl. 15—104.3)

The present invention relates to tools and implements for cleaning drain tile and similar conduits without removing them from embedded position in the ground.

Such conduits become filled or partially filled with an accumulation of dirt or other foreign matter and require cleaning from time to time. The fact that the conduits are generally embedded in the ground throughout more or less all their length makes cleaning a difficult problem. Heretofore various devices have been proposed for use in the cleaning operation, but, so far as I am aware, none of these devices has been entirely satisfactory.

The primary object of the present invention is to provide a tool or a combination of tools which will be entirely practical and satisfactory for use in quickly and expeditiously removing such accumulations and which will be easily operated, inexpensive to make, and durable in use.

A preferred embodiment of the invention which has given satisfactory service in actual use is shown on the accompanying drawings, in which Figure 1 is a sectional view of a drain tile in place in the ground, taken lengthwise through the conduit, and showing the manner in which one embodiment of the invention is used;

Fig. 2 is a similar view showing another embodiment of the invention in use;

Fig. 3 is a side elevational view of the embodiment of the invention shown in Fig. 1;

Fig. 4 is a side elevational view of the embodiment of the invention shown in Fig. 2;

Fig. 5 is a lengthwise sectional view of the implement shown in Fig. 4, taken on the line 5—5 of Fig. 6;

Fig. 6 is a cross sectional view, taken on the line 6—6 of Fig. 4;

Fig. 7 is a cross sectional view taken on the line 7—7 of Fig. 3; and

Fig. 8 is an end elevational view of the tool shown in Fig. 3.

Generally speaking, the invention provides a tool or a plurality of tools which can be pulled through a length of drain tile or the like in situ to cut and loosen a deposit of dirt or the like settled or encrusted in the conduit and then forcibly push the loosened material through the conduit into a pile at an end of the conduit from which it can be removed.

Referring first to Fig. 1, the reference numeral 1 designates a length of drain tile or other type of pipe, hereinafter generically designated conduit, embedded in the ground and providing a continuous line for the drainage of water between its inlet and outlet ends (not shown). The line is of course continuous or substantially continuous between its ends. When stoppage or reduction of flow occurs by reason of some accumulation, a pair of holes, designated A and B in the drawing, are dug at spaced points along the line so as to expose the conduit on opposite sides of the stoppage, or to provide access to such length of conduit as can be conveniently cleaned by use of the means which forms the subject of this invention.

The distance separating the holes A and B will be determined by the character of the obstruction which is to be removed, by the power which is available to pull the tools through the conduit as hereinafter explained, by the tensile strength of the cable which is used, and by other factors. The specific location of the holes is determined by the use of a probing rod or other means for ascertaining the exact line on the surface under which the conduit lies.

When the location for the holes has been determined, they are dug to expose the conduit and short sections of the conduit are removed, as shown in Fig. 1, thus exposing the two ends of the conduit section which is to be cleaned.

A flexible line is then passed through the section, from one end to the other. This line may take the form of a "snake" or plumber's tape, which is a familiar instrument in use by plumbers for fishing through pipes. With such a line passed entirely through the section and extending from both ends thereof, a stout cable 2 is fastened to one end of the line and pulled entirely through the section, so as to extend from both ends thereof and up through the holes A and B to the surface of the ground. A tool provided by the present invention is then attached to one end of the cable, a similar length of cable 3 is secured to the other end of the tool, and the tool is pulled through the section, back and forth as often as may be required to loosen the sediment and other deposit, with one or another of the two cables trailing as the other cable is pulled, until the tool passes easily through the section, thus indicating that the deposit is substantially loosened. In some cases it is desirable to pour water into the conduit during this part of the operation in order to assist in loosening some of the harder caked material.

The foregoing general method of operation is old in the art. The present invention resides in the specific structure of the tools that are used.

Figs. 3–8 show two forms of tool provided by the present invention. The tool shown in Figs. 3, 7 and 8 is a cutting device. The tool shown in Figs. 4, 5 and 6 is a combination cutting and removing device.

The cutter shown in Figs. 3, 7 and 8 is a metallic body made of stout iron, steel or other plate, formed to a curvature which is almost completely cylindrical near one end of the tool and is of a diameter slightly less than the diameter of the conduit which is to be cleaned. This tool, designated 5 in its entirety, has its cylindrically curved wall bevelled or inclined from a point at or adjacent its most completely cylindrical end portion, toward and to its opposite end portion, to provide a pair of cutting edges 6, which may be more or less sharpened to enhance their cutting effect. These edges may be regarded as terminating at the forward end of the tool, where an eye 7, in the form of a loop as shown in the drawing, may be welded or otherwise stoutly secured inside the tool. The other end of the tool, which may be regarded as its trailing edge, may be similarly sharpened and adjacent to this end the wall is provided with a hole 8. The functions of the eye 7 and hole 8 are to provide anchorage means for the cables 2 and 3. The body of the tool may have openings 9 cut into it for the purpose of decreasing its weight and also to provide cutting edges in the tool material surrounding the openings, and to permit material loosened from the conduit to drop or otherwise pass through the openings.

In use, the tool 5 is connected to the end of a cable 2 which has been passed through conduit 1 between the holes A and B. A cable 3 is then securely attached to the hole 8 at the trailing end of the tool. The tool is then inserted into the end of the conduit section which projects into the hole B. The cable 2 is then pulled, by hand or power depending on the force required, and in this way the tool is pulled through the section from the hole B to the hole A.

In this traverse of the section the cutting edges 6 sever deposits and incrustations from the inner walls of the conduit. At the end of a single first traverse the tool may be pulled back through the section, from the hole A to the hole B. In this movement the cutting edge at the rear of the tool acts on matter not previously dislodged from the conduit wall and loosens it. The tool may be pulled back and forth as many times as may seem to be necessary to complete the loosening of material.

The tool 5 is then removed from the conduit section, disconnected from the cables 2 and 3, and is replaced by the tool 10, shown in Figs. 4, 5 and 6. Like the tool 5, this tool is made of stout metal plate curved to parti-cylindrical shape of the same cross sectional size as the tool 5. However, the tool 10, which is a dirt remover, has its surfaces which are shown at the bottom in the figures upwardly bevelled or sloping from the center of the tool to both of its ends. These edges may be somewhat sharpened, so as to give them also a cutting effect. The ends of the tool 10 are provided with eyes 14, shown made like the eye 7 of the tool 5, but they may be made in the form of simple openings, like the one shown at 8 in Fig. 3, since their function is to provide anchorage for the cables 2 and 3.

At about its center the tool 10 has, welded in its upper portion, an eye 15, providing a bore arranged transversely of the length of the tool. A pivot pin 16, which may be inserted through an adjacent opening 17 in the wall of the tool, is passed through this eye to mount pivotally on it, through the medium of bored ears 18, a swinging closure plate 19. This plate is almost circular, having somewhat flattened sides as shown in Fig. 6, and has near its edge diametrically opposite the ears 18 a hole 20 in which is fixed one end of a chain or other flexible connection 21, the other end of which is anchored, preferably by a hook or other separable connection 22, to one of the end portions of the tool, such as one of the eyes 14. The length of the chain 21 is such that the gate 19 is prevented from swinging in one direction beyond a plane which is normal to the axis of the tool. The gate is free to swing in the other direction substantially well up into the tool, as shown in dotted lines in Fig. 5.

With the tool 10 secured to the cables 2 and 3, and pulled through the conduit section as shown in Fig. 2, it will be apparent that when traveling in one direction, as to the right in Fig. 5, the gate 19 will swing back toward its dotted line position when dirt is encountered, but will be forced down to its full line position when the direction of movement of the tool is reversed. Pulled in this reversed direction the gate pushes dirt before it and discharges the same from one end of the conduit section, as into the hole A, from which it is readily removed. The tool is traversed back and forth in the pipe section as many times as may be required to clean from the section all the material that has been loosened in it.

It will be noted that the pin 16 is made readily removable from the eye 15, since it is held in place by the cotter pin 23. It is thus possible to detach the gate 19 as well as the chain 21 from the tool 10 and use this tool as a cutter, in the manner described for the tool 5. Thus, the tool 10 can be employed for the entire work of cutting and removing incrustations. The advantage of using the tool 5 in addition to the tool 10 is that it thus becomes unnecessary to mount and remove the gate 19.

When a section of conduit has been cleaned, work is begun on the next adjacent section, using one of the holes A or B and digging a third hole further along the line. Thereafter, the removed lengths of conduit at the ends of the section which has been cleaned are put back in place and the holes A and B are filled.

I claim:

1. A tool for cleaning drain tile and similar conduits comprising a metal body of arcuate form in cross section having an outside diameter somewhat less than that of the conduit to be cleaned and having its normally upper surface extending the full length of the body and its front and rear edges beveled back from the front and rear ends of the body and sharpened to provide edges operable in cutting relation on deposits of material when the body is pulled in either direction through the conduit, and eye formed on the inside of said normally upper surface of the body substantially midway between said front and rear ends, substantially equidistant from said cutting edges and having a bore extending transversely of the length of the body and aligned with an opening in a side of the body, a gate having a width somewhat narrower than the cross-sectional shape of the body and having a bored lug projecting from its upper edge, a hinge pin insertible through said body side opening and standing through the bores of said eye and lug whereby the gate is hung within the body for swinging movement, enlargements provided on the ends of the pin for holding the pin in said eye and lug, the enlargement farthest from the body side opening being removable for permitting the pin to be withdrawn through said body side opening for removal of the gate, and a separable flexible connection between the free end portion of the gate and one end portion of the body, whereby the gate is removably mounted for free swinging movement toward said end portion of the body when the body is pulled in one direction through a conduit and is held by said flexible connection in substantially diametrical relation to the body when the body is pulled in the opposite direction through the conduit.

2. A tool as claimed in claim 1 in which the front edges of the body are continuous with the rear edges and merge therewith and in which said edge at one side of the body is narrowly spaced from the edge at the other side of the body at substantially the transverse median plane of the body opposite the eye.

References Cited in the file of this patent

UNITED STATES PATENTS

| Number | Name | Date |
|---|---|---|
| 672,593 | Connally | Apr. 23, 1901 |
| 789,940 | Shannon | May 16, 1905 |
| 951,202 | Shirk | Mar. 8, 1910 |
| 955,812 | Kuhlman | Apr. 19, 1910 |
| 1,081,488 | Culver | Dec. 16, 1913 |
| 1,823,144 | Homolya | Sept. 15, 1931 |
| 1,897,859 | Penrose | Feb. 14, 1933 |